United States Patent

Ogura

[11] Patent Number: 6,061,397
[45] Date of Patent: May 9, 2000

[54] MOTION VECTOR DETECTING DEVICE

[75] Inventor: Eiji Ogura, Saitama, Japan

[73] Assignee: Sony Corporation, Tokyo, Japan

[21] Appl. No.: 08/423,953

[22] Filed: Apr. 18, 1995

[30] Foreign Application Priority Data

Apr. 19, 1994 [JP] Japan .................................. 6-104707

[51] Int. Cl.[7] .................................................... H04N 7/32
[52] U.S. Cl. ........................... 375/240; 348/699; 348/416
[58] Field of Search .................... 348/699, 413, 348/402, 416, 700; 382/236, 238; 386/109, 111; 375/240; H04N 7/13

[56] References Cited

U.S. PATENT DOCUMENTS 4,937,666  6/1990  Yang ........................................ 348/413
5,488,419  1/1996  Hui et al. ................................ 348/699

FOREIGN PATENT DOCUMENTS

| 0 468 279 A2 | 1/1992 | European Pat. Off. . | |
| 0 560 577 A2 | 9/1993 | European Pat. Off. | H04N 7/13 |
| 0 572 904 A2 | 12/1993 | European Pat. Off. . | |
| 0 637 894 A3 | 2/1995 | European Pat. Off. . | |

*Primary Examiner*—Vu Le
*Attorney, Agent, or Firm*—Frommer Lawrence & Haug, LLP.; William S. Frommer

[57] ABSTRACT

A first matching operational circuit detects correlation between output signal of the reference block memory and the search block memory with integer-pel accuracy. A second matching operational circuit detects correlation between output signal of a reference block buffer memory and a search block buffer memory with less than or equal to half-pel accuracy. The first matching operational and the second matching operational circuit are operated in parallel.

12 Claims, 8 Drawing Sheets

DIAGONALLY INTERPOLATIVE DATA $d00 = (s00+s10+s01+s11)/4$, $d01 = (s01+s11+s02+s12)/4$
$d02 = (s02+s12+s03+s13)/4$, $d03 = (s03+s13+s04+s14)/4$
$d10 = (s10+s20+s11+s21)/4$, $d11 = (s11+s21+s12+s22)/4$ $d12 = (s12+s22+s13+s23)/4$, $d13 = (s13+s23+s14+s24)/4$
$d20 = (s20+s30+s21+s31)/4$, $d21 = (s21+s31+s22+s32)/4$
$d22 = (s22+s32+s23+s33)/4$, $d23 = (s23+s33+s24+s34)/4$
$d30 = (s30+s40+s31+s41)/4$, $d31 = (s31+s41+s32+s42)/4$
$d32 = (s32+s42+s33+s43)/4$, $d33 = (s33+s43+s34+s44)/4$

HORIZONTALLY INTERPOLATIVE DATA $h00 = (s01+s11)/2$, $h01 = (s02+s12)/2$, $h02 = (s03+s13)/2$
$h10 = (s11+s21)/2$, $h11 = (s12+s22)/2$, $h12 = (s13+s23)/2$
$h20 = (s21+s31)/2$, $h21 = (s22+s32)/2$, $h22 = (s23+s33)/2$
$h30 = (s31+s41)/2$, $h31 = (s32+s42)/2$, $h32 = (s33+s43)/2$

VERTICALLY INTERPOLATIVE DATA $v00 = (s10+s11)/2$, $v01 = (s11+s12)/2$,
$v02 = (s12+s13)/2$, $v03 = (s13+s14)/2$,
$v10 = (s20+s21)/2$, $v11 = (s21+s22)/2$,
$v12 = (s22+s23)/2$, $v13 = (s23+s24)/2$,
$v00 = (s30+s31)/2$, $v21 = (s31+s32)/2$,
$v02 = (s32+s33)/2$, $v23 = (s33+s34)/2$,

Fig. 7
(Prior Art)

$$\text{dist}(0, 0) = |r00-s11|+|r01-s12|+|r02-s13|$$
$$+|r10-s21|+|r11-s22|+|r12-s23|$$
$$+|r20-s31|+|r21-s32|+|r22-s33|$$

$$\text{dist}(-0.5, -0.5) = |r00-d00|+|r01-d01|+|r02-d02|$$
$$+|r10-d10|+|r11-d11|+|r12-d12|$$
$$+|r20-d20|+|r21-d21|+|r22-d22|$$

$$\text{dist}(-0.5, 0) = |r00-h00|+|r01-h01|+|r02-h02|$$
$$+|r10-h10|+|r11-h11|+|r12-h12|$$
$$+|r20-h20|+|r21-h21|+|r22-h22|$$

$$\text{dist}(-0.5, 0.5) = |r00-d01|+|r01-h02|+|r02-d03|$$
$$+|r10-d11|+|r11-d12|+|r12-d13|$$
$$+|r20-d22|+|r21-d22|+|r22-d23|$$

$$\text{dist}(0, -0.5) = |r00-v00|+|r01-v01|+|r02-v02|$$
$$+|r10-v10|+|r11-v11|+|r12-v12|$$
$$+|r20-v20|+|r21-v21|+|r22-v22|$$

$$\text{dist}(0, 0.5) = |r00-v01|+|r01-v02|+|r02-v03|$$
$$+|r10-v11|+|r11-v12|+|r12-v13|$$
$$+|r20-v22|+|r21-v22|+|r22-v23|$$

$$\text{dist}(0.5, -0.5) = |r00-d10|+|r01-d11|+|r02-d12|$$
$$+|r10-d20|+|r11-d21|+|r12-d22|$$
$$+|r20-d30|+|r21-d31|+|r22-d32|$$

$$\text{dist}(0.5, 0) = |r00-h10|+|r01-h11|+|r02-h12|$$
$$+|r10-h20|+|r11-h21|+|r12-h22|$$
$$+|r20-h30|+|r21-h31|+|r22-h32|$$

$$\text{dist}(0.5, 0.5) = |r00-d11|+|r01-d12|+|r02-d13|$$
$$+|r10-d21|+|r11-d22|+|r12-d23|$$
$$+|r20-d32|+|r21-d32|+|r22-d33|$$

Fig. 11A  DATA OF REFERENCE BLOCK

Fig. 11B  SEARCH DATA

Fig. 11C  OPERATION WITH INTEGRAL-PEL ACCURACY

Fig. 11D  FIRST OPERATION WITH HALF-PEL ACCURACY

Fig. 11E  SECOND OPERATION WITH HALF-PEL ACCURACY

MOTION VECTOR DETECTING DEVICE

BACKGROUND OF THE INVENTION

1. Field of the Invention

This invention relates, in particular, to a motion vector detector suitable for use in a picture predictive coding device.

2. Description of the Related Art

Figure 1:
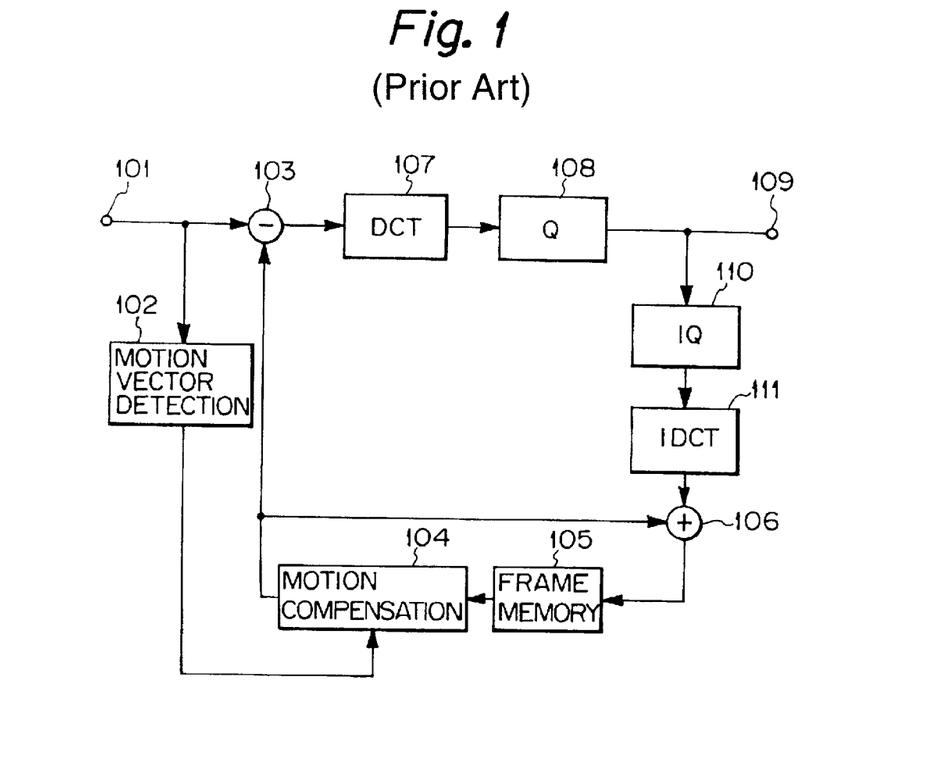
FIG. 1 is a block diagram used for explanation of a predictive coding device.

A predictive coding system, such as MPEG (Moving Picture Coding Experts Group), is known, which encodes a picture by utilizing correlations with other frames. FIG. 1 shows one of devices for such predictive coding.

In FIG. 1, image data is supplied to an input terminal 101. The image data is supplied to a motion vector detecting circuit 102 and to a subtracter circuit 103. Then an interframe motion vector is obtained in the motion vector detecting circuit 102. The motion vector, obtained, is supplied to a motion compensation circuit 104.

On the other hand, image data of a reference frame is stored in a frame memory 105. Output from the frame memory 105 is supplied to the motion compensation circuit 104. The image data from the frame memory 105 is motion-compensated in the motion compensation circuit 104 on the basis of the motion vector obtained by the motion vector detecting circuit 102. The motion-compensated image data is supplied to the subtracter circuit 103 and to the adder circuit 106.

Image data of a current frame from the input terminal 101 and image data of the reference frame, which has been motion-compensated by the motion compensator circuit 104, are supplied to the subtracter circuit 103. The subtracter circuit 103 executes subtraction between the image data of the current frame and the image data of the reference frame to obtain a differential data of the successive frames. The differential data is supplied to a DCT circuit, and is DCT-converted there. Output from the DCT circuit 107 is supplied to a quantizer 108, and is quantized there. The quantizer 108 exerts its output through an output terminal 109.

The differential data, DCT-converted and quantized, is supplied to a inverse quantizer 110 and to a inverse DCT circuit 111, then converted back to the original differential data, and supplied to the adder 106. The adder 106 is supplied with the image data of the inverse frame from the motion compensation circuit 104. The adder 106 adds to the reference frame image data the differential data between the reference frame and the current frame to obtain an image data of the current frame. The image data of the current frame, thus obtained, is stored in the frame memory 105 for use as a next reference frame.

In this fashion, the interframe predictive coding process encodes a differential data between a current frame end a reference frame which has been motion-compensated on the basis of a motion vector. Block matching is known as a method for detecting such a motion vector to be used for interframe predictive coding process.

Figure 2:
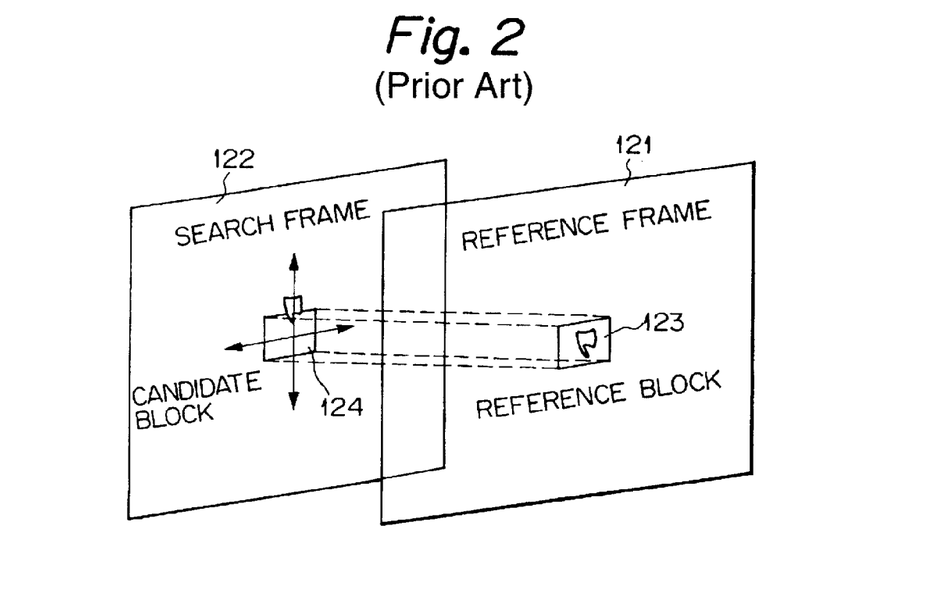
FIG. 2 is a schematic diagram used for explaining detection of a motion vector.

FIG. 2 illustrates the block matching method. In FIG. 2, 121 denotes a reference frame, and 122 is a search frame. A reference block 123 is defined in the reference frame 121, and a candidate block 124 is defined in the search frame 122. The candidate block 124 of the search frame 122 is moved over a predetermined search area to determine how much it coincides with the reference block 123 of the reference frame 121. Then a candidate block 124 representing a most coincidence with the reference block is employed as a matching block, and the motion vector is obtained from the matching block.

Figure 3:
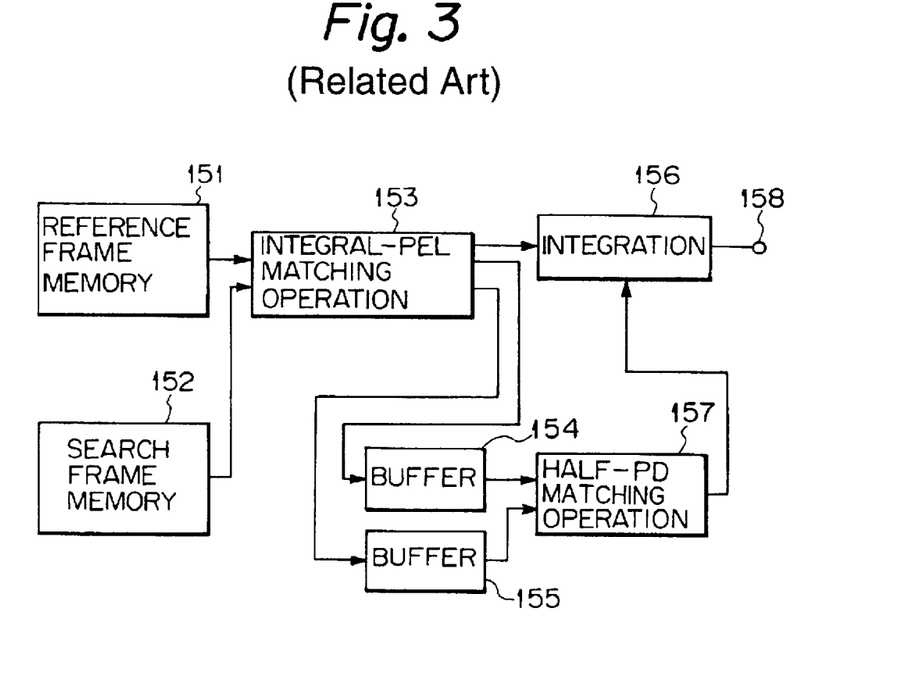
FIG. 3 is a block diagram of an existing motion vector detecting circuit.

FIG. 3 shows a motion vector detector circuit conventionally available for detecting a motion vector by the block matching method. This circuit is designed to cope with detection of motion vectors at the rate of a half pixel.

In FIG. 3, numeral 151 designates a reference frame memory, and 152 designates a search frame memory. The reference frame memory 151 stores data of the reference block. Data of the reference block is read out from the reference frame memory 151 and supplied to an integral-pel matching operational circuit 153. The search frame memory 152 stores pixel data of the search frame, and a predetermined number of pixels (hereinafter referred to as the integer pixel rate) of a search area is supplied to the integer-pel matching operational circuit 153 to detect a motion vector.

Output from the integer-pel matching operational circuit 153 is supplied to buffer memory 154 and 155, and to an integrating circuit 156. The buffer memory 154 stores pixel data of the reference block. The buffer memory 155 stores pixel data of a search area surrounding the motion vector obtained at the integer pixel rate.

Outputs from the buffer memory 154 and 155 are supplied to a half-pel matching operational circuit 157 to detect a motion vector there at the half-pixel rate. The half-pel motion vector is supplied to the integrating circuit 156.

The integrating circuit 156 incorporates the integer-pel motion vector obtained by the integer-pel matching operational circuit 153 with the half-pel motion vector obtained by the half-pel matching operational circuit 157. The resulting motion vector is output from an output terminal 158.

Detection of the half-pel motion vector is performed by obtaining eight search blocks by interpolation, which are positionally different by a half pixel, then matching-processing the search block and the reference block, then comparing the eight matching errors with the matching error of the one-pixel position at the center, and choosing a point with a smallest error as an optimum motion vector.

Figure 4A:
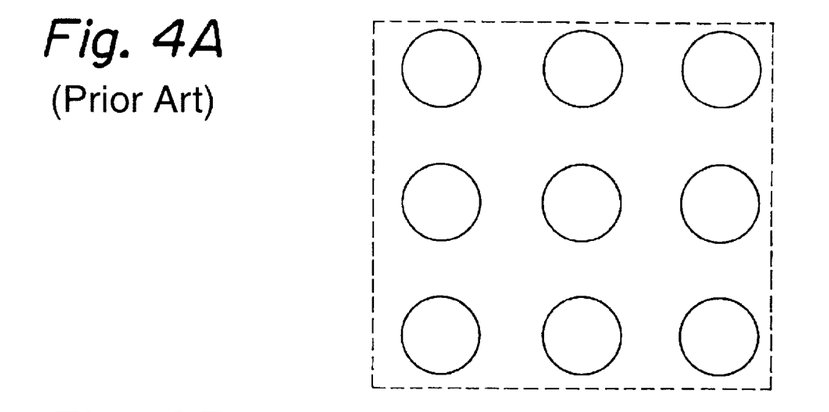
FIGS. 4A and 4B are schematic views used for explanation of the existing motion vector detecting circuit.
Figure 4B:
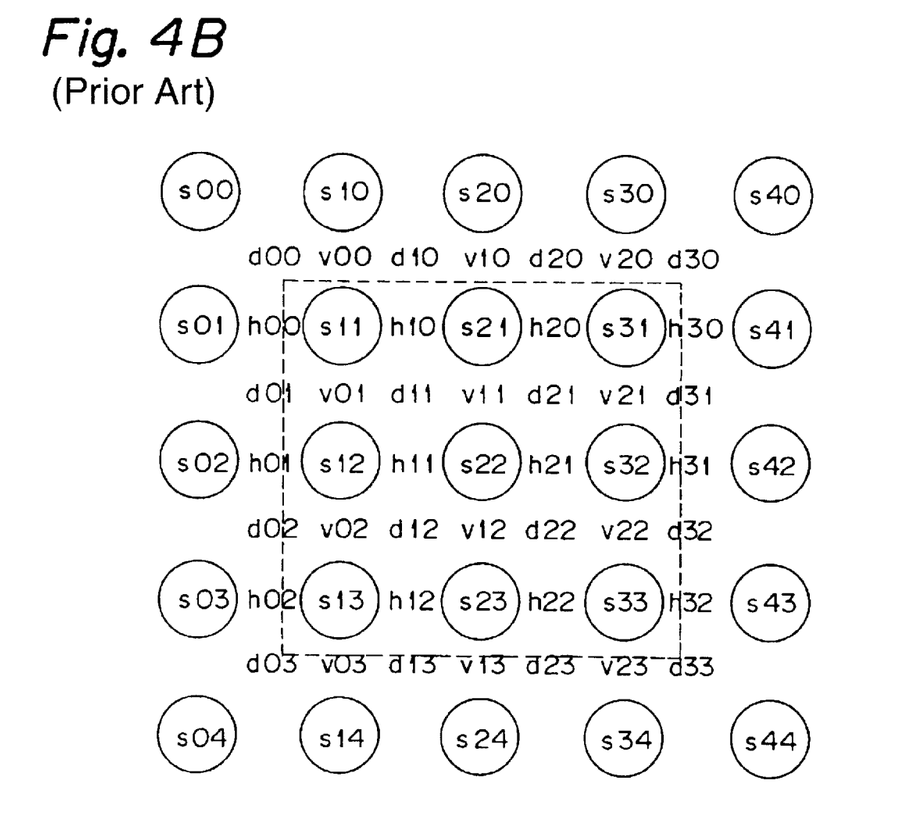
Figure 5:
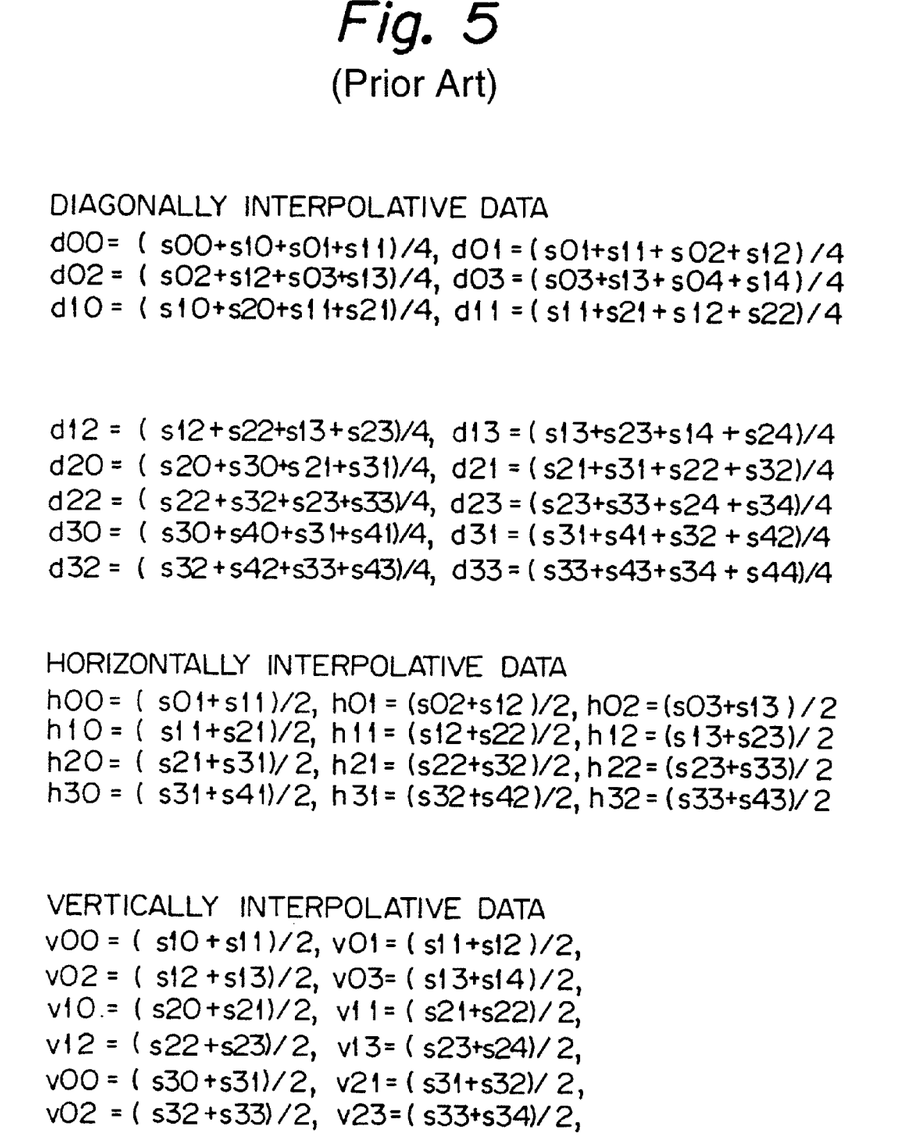
FIG. 5 is a schematic view used for explaining the existing motion vector detecting circuit.
Figure 6:
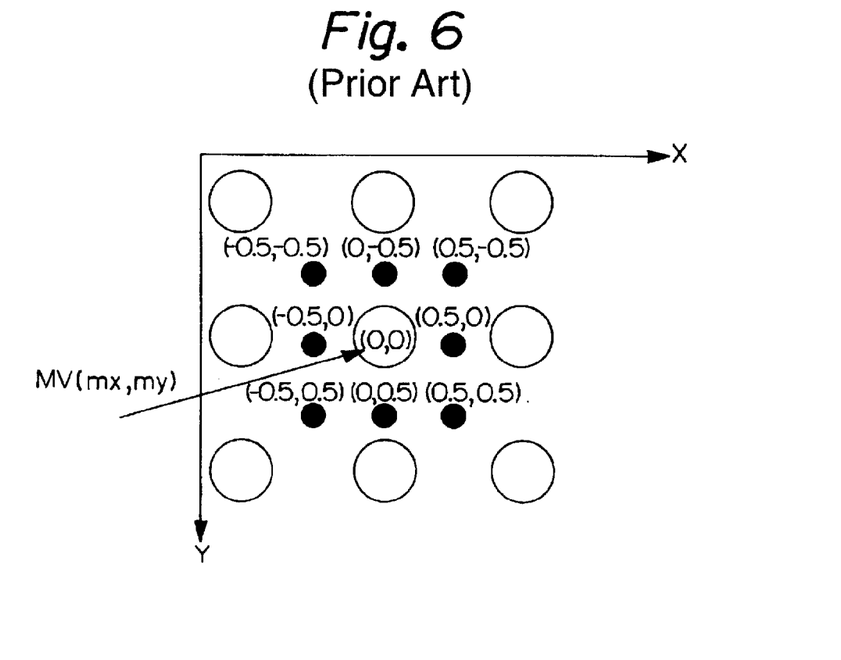
FIG. 6 is a schematic view used for explaining the existing motion vector detecting circuit.

That is, assume that 3×3 pixels define a block as shown in FIG. 4A. Then, as shown in FIG. 4B, search data necessary for interpolation is 5×5 pixels (s00 to s44). Made from the search data s00 to s44 are diagonally interpolative data d00 to d33, horizontally interpolative data h00 to h32 and vertically interpolative data v00 to v23. For a block of N×M, in general, data necessary for interpolation is (N+2)× (M+2). Interpolation is done by operation as shown in FIG. 5. FIG. 6 shows the center of a block for half-pel vector detection. Circles are pixels. The center point (0, 0) of FIG. 6 represents a one-pixel motion vector MV (mx, my). Matching process is executed at surrounding eight points distant by a half pixel from the center point (0, 0). When the matching error at a point (x, y) in FIG. 6 is named dist(x, y), specific matching errors are as shown in FIG. 7. From these, a block with a smallest matching error is detected, and a final motion vector is obtained.

Japanese patent application numbers: 04-163,833 (File Date: 1992.05.29), 05-210,996 (File Date: 1993.08.03), 06-043,131 (File Date: 1994.02.17), 06-022,223 (File Date 1994.01.21) and U.S. Pat. No. : 5,173,771 were proposed as the related applications of the MPEG of this invention. Each of the above applications is owned by the assignee of the present invention and is hereby incorporated by reference. U.S. patent applications corresponding to the above four Japanese patent applications are pending.

As so far discussed, in case of obtaining a half-pel motion vector, data necessary for interpolation for a block with the dimension of N×M is (N+2)×(M+2). Therefore, for a block with the dimension of (16×16), (18×18) pixels must be read out from the buffer memory 155. In contrast, a one-pixel motion vector is obtained with (16×16=256) clocks in the integer-pel matching operational circuit 153. Therefore, data must be read out from the buffer memory 155 with clocks of 1.27 times the clocks ((18×18)/(16×16)=324/256=1.27) for reading a picture. It is difficult to operate the buffer memory with clocks irrelevant to the data reading clocks.

It is therefore an object of the invention to provide a motion vector detecting device not requiring clocks irrelevant to data reading clocks.

SUMMARY OF THE INVENTION

The invention is a motion vector detecting circuit comprising an integer-pel matching operational circuit; and a circuit for matching operation at the half or smaller pixel rate, the integer-pel matching operational circuit and the circuit for matching operation at the half or smaller pixel rate being operated in parallel.

The invention is a motion vector detecting circuit comprising an integer-pel matching operational circuit; a circuit for matching operation at the rate of a half or smaller pixel; buffer memory storing data of a reference block; and a FIFO storing data of a search area, output of the buffer memory and output of the FIFO being supplied to the circuit for matching operation at the half or smaller pixel rate, and the integer-pel matching operational circuit and the circuit for matching operation at the half or smaller pixel rate being operated in parallel.

In the present invention, detection of motion vectors at the integer pixel rate and detection of motion vectors at the half-pixel rate proceed in parallel such that half-pel motion vectors are always provided. As a result, the device does not need clocks irrelevant to the reading of data, and its circuit arrangement can be simplified.

The above, and other, objects, features and advantage of the present invention will become readily apparent frome the following detailed description thereof which is to be read in connection with the accompanying drawings.

BRIEF DESCRIPTION OF THE DRAWINGS

FIG. 7 is a schematic view used for explaining the existing motion vector detecting circuit;

DETAILED DESCRIPTION OF THE PREFERRED EMBODIMENTS

Figure 8:
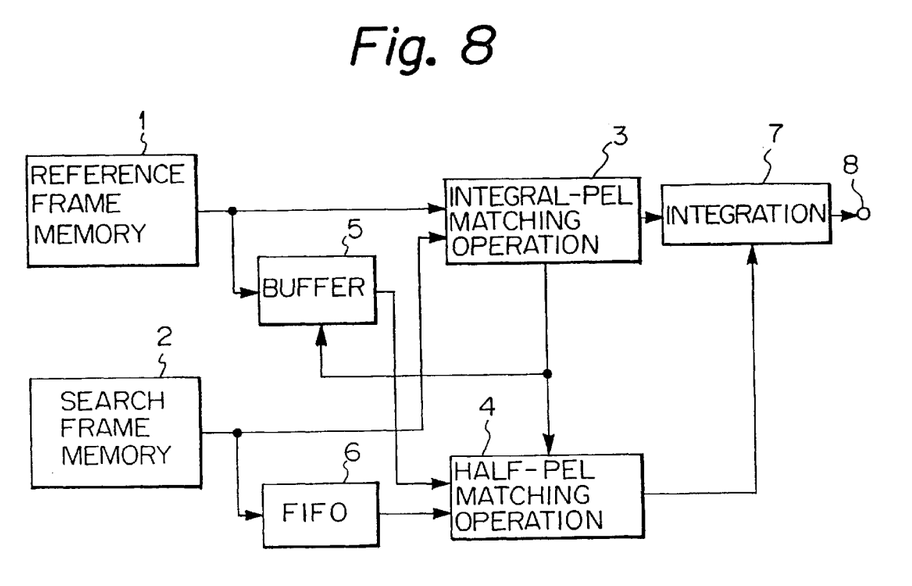
FIG. 8 is a block diagram showing a basic structure of the present invention.

An embodiment of the invention is described below with reference to the drawings. FIG. 8 is a block diagram for illustrating a basic structure of a motion vector detecting circuit to which the invention is applied. In FIG. 8, numeral 1 denotes a reference frame memory which stores image data of a reference frame, 2 refers to a search frame memory which stores image data of a search frame, 3 refers to an integer-pel matching operational circuit, 4 refers to a half-pel matching operational circuit, 5 refers to buffer memory, and 6 refers to a FIFO. Preferably, the image data is a video frame signal.

As shown in FIG. 8, in the present invention, the integer-pel matching operational circuit 3 and the half-pel matching operational circuit 4 are operated in parallel. That is, reference block data and search area data are read out from the reference frame memory 1 and the search frame memory 2, respectively. The reference block data and the search area data are input to the integer-pel matching operational circuit 3. At the same time, the reference block data is sent to the buffer memory 5, and the search area data is sent to the FIFO 6. It is thus possible to reduce the frequency of access to the respective memory 1, 2 for reading into once.

Output from the FIFO 6 always executes interpolation for pixels at half-pel positions. Matching errors corresponding to positions in the search area are output from the integer-pel matching operational circuit 3 in sequence with every clock. When a matching error is output from the integer-pel matching operational circuit 3, a pixel necessary for interpolation of its position is output from the FIFO 6. The delay of the FIFO 6 corresponds to the time necessary for determining the matching error of a first one-pixel vector position after entry of the search frame into the integral-pel matching operational circuit 3.

The half-pel matching operational circuit 4 executes interpolation using output data from the FIFO 6, and makes data of a half-pel position. A matching error is obtained between the value of the interpolation and the data of the reference block read out from the buffer memory 5. If a new matching error with a small value is output from the integral-pel matching operational circuit 3, then the entirety is initialized in the half-pel matching operational circuit 4. Then, operation of matching errors between the data of half-pel position and the data of the reference block is re-done from the beginning. The integrating circuit 7 incorporates the integer-pel motion vector and the half-pel motion vector. Output of the integrating circuit 7 exits from the output terminal 8.

Figure 9:
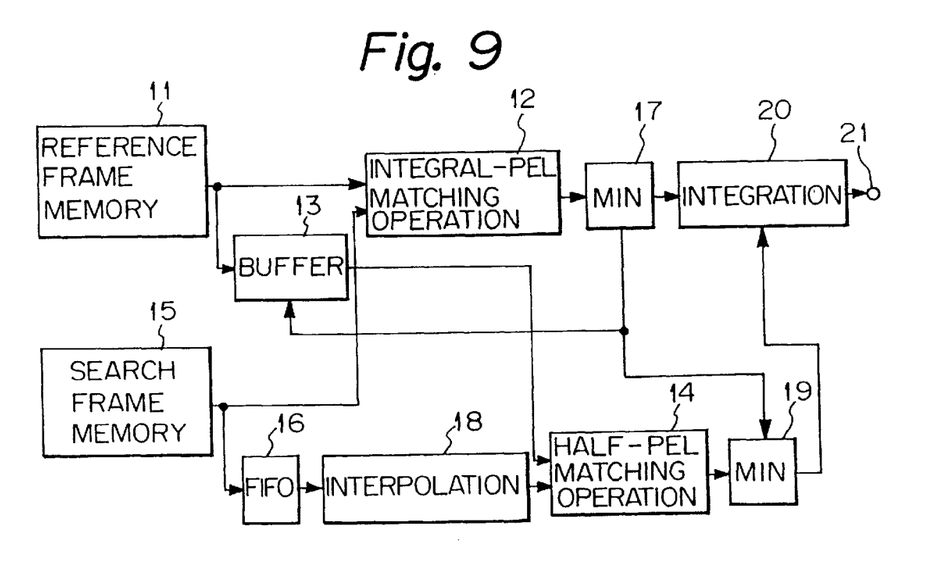
FIG. 9 is a block diagram of one embodiment of the invention.

FIG. 9 shows a specific embodiment. In FIG. 9, a reference frame memory 11 stores pixel data of a reference frame. The pixel data of the reference block is read out from the reference frame memory 11, and supplied to an integer-pel matching operational circuit 12 and to buffer memory 13. Output of the buffer memory 13 is supplied to a half-pel matching operational circuit 14.

The search frame memory 15 stores pixel data of a search frame. Pixel data of a search area is read out from the search frame memory 15, and supplied to the integer-pel matching operational circuit 12 and to a FIFO 16. The delay of the FIFO 16 corresponds to the time necessary for determining the matching error of a first one-pixel motion vector after entry of the search frame into the integer-pel matching operational circuit 12. For example, if the dimension of the block is (16×16), the delay corresponds to 256 clocks. Output of the FIFO 16 is supplied to an interpolative circuit 18 which in turn produces interpolative data among respective pixels. Output of the interpolative circuit 18 is supplied to the half-pel matching operational circuit 14.

The integer-pel matching operational circuit 12 executes block matching between the reference block and the search block at the rate of one pixel, and obtains a matching error. The integer-pel matching operational circuit 12 outputs matching errors with every clock. Output of the integer-pel matching operational circuit 12 is supplied to a minimum value detecting circuit 17. A search block with a smallest error is detected in the minimum value detecting circuit 17, and a motion vector at the rate of one pixel is obtained, accordingly. The motion vector at the rate of one pixel is supplied to an integrating circuit 20.

Once the motion vector at the rate of one pixel is obtained, a control signal is generated from the minimum value detecting circuit 17. The control signal is supplied to the buffer memory 13 and to a minimum value detecting circuit 19. The half-pel matching operational circuit 14 executes block matching of the reference block and the search block at the rate of a half pixel by using the interpolative pixels, and obtains a matching error. Output of the half-pel matching operational circuit 14 is supplied to the minimum value detecting circuit 19. Output of the minimum value detecting circuit 19 is supplied to an integrating circuit 20.

Obtained from the output of the minimum value detecting circuit 17 is a motion vector at the rate of one pixel. Obtained from the output of the minimum value detecting circuit 19 is a motion vector at the rate of a half or smaller pixel. The integrating circuit 20 combines the output of the minimum value detecting circuit 17 and the output of the minimum value detecting circuit 19 and finally obtains a motion vector. Output of the integrating circuit 20 exits from an output terminal 21.

Figure 10:
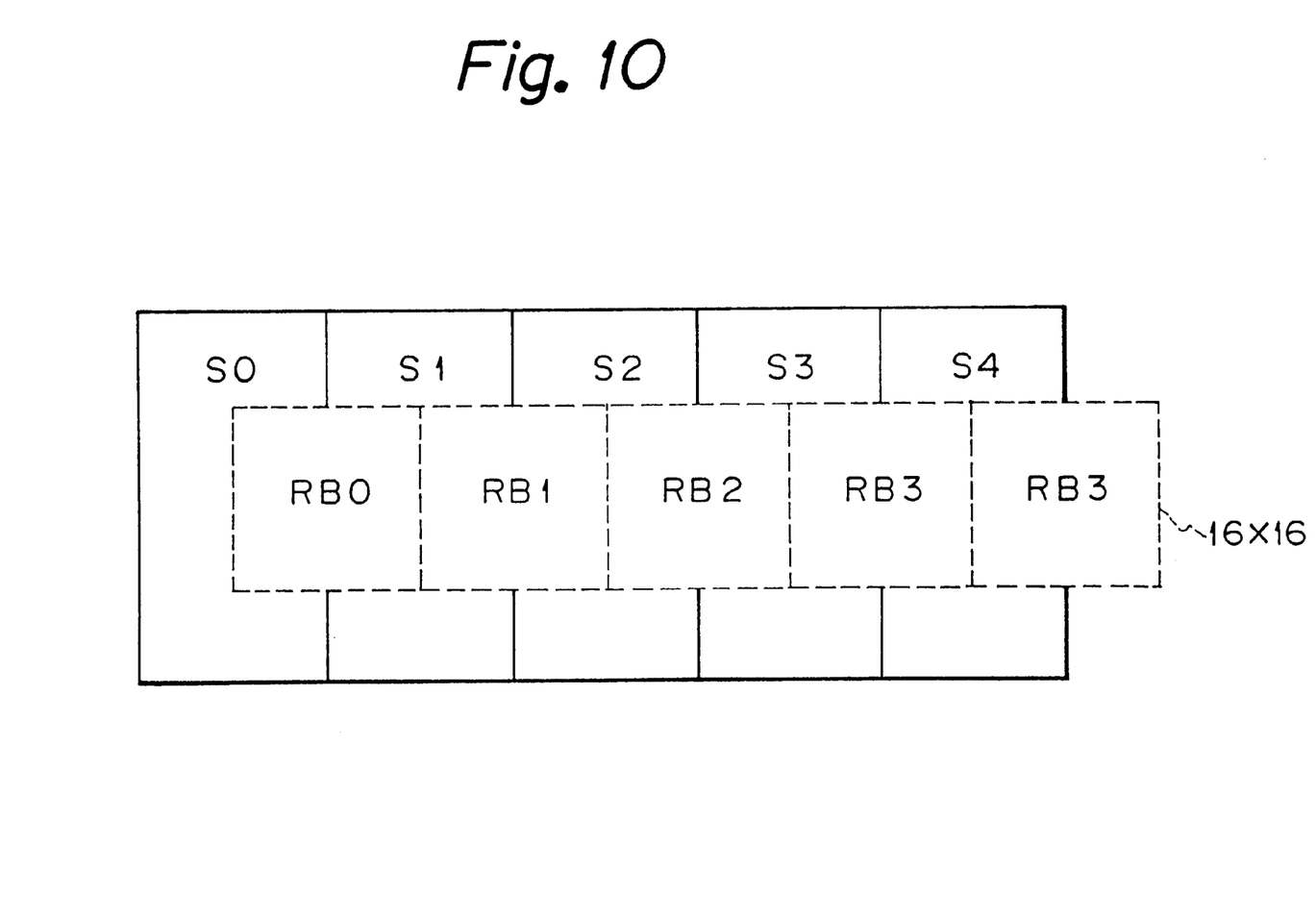
FIG. 10 is a schematic diagram used for explanation of the embodiment of the invention.
Figure 11A:
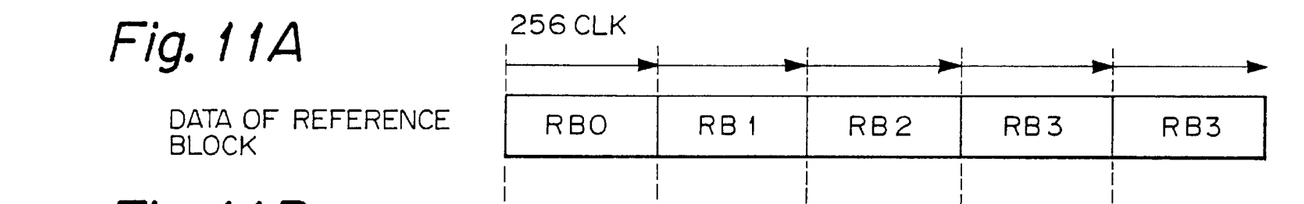
FIGS. 11A to 11E are timing diagrams used for explanation of the embodiment of the invention.
Figure 11B:
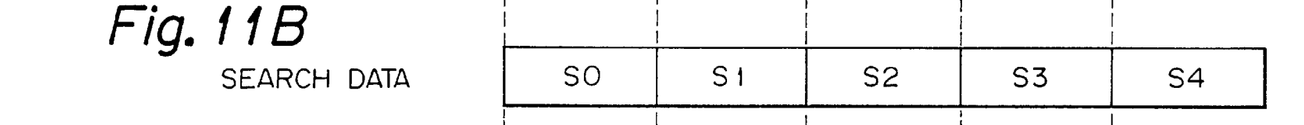

FIG. 10 and FIGS. 11A to 11E show the behavior of the embodiment of the invention. As shown in FIG. 10, each reference block contains 16×16 pixels. As shown in FIG. 11A, reference blocks RB0, RB1, RB2, . . . are input in sequence. As shown in FIG. 11B, search data S0, S1, S2, . . . are input in sequence. Each of the search data S0, S1, S2, . . . contains 16×31 pixels.

Figure 11C:
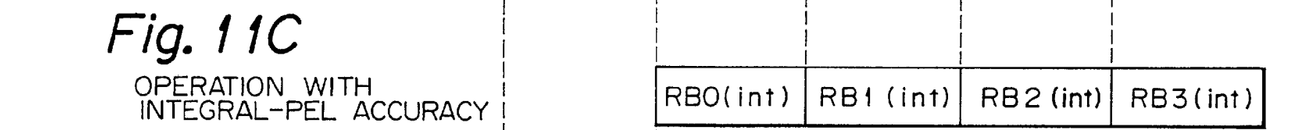

In the period from $t_0$ to $t_1$, the reference block RB0 enters with 256 clocks, and the search data S0 also enters. The error RB0(int) of the search data S0 for the reference block RB0 is output from $t_1$ with every clock, as shown in FIG. 11C.

Figure 11D:
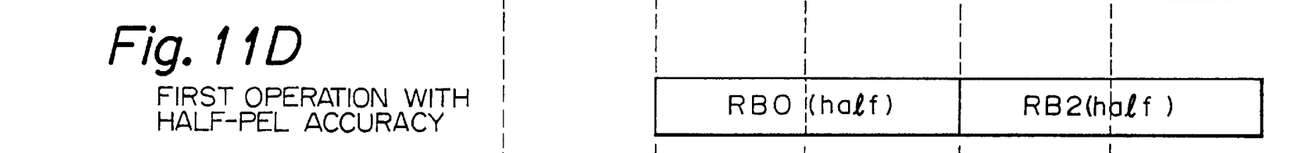

Output of the integer-pel matching error for the reference block RB0 starts at time $t_1$. At the same time, data is read out from the FIFO 16 to perform interpolation, and half-pel matching operation is executed by the half-pel matching operational circuit 14, as shown in FIG. 11D. The maximum period for the half-pel matching operation is 256 clocks after completion of integer-pel matching operation of the reference block RB0.

Figure 11E:
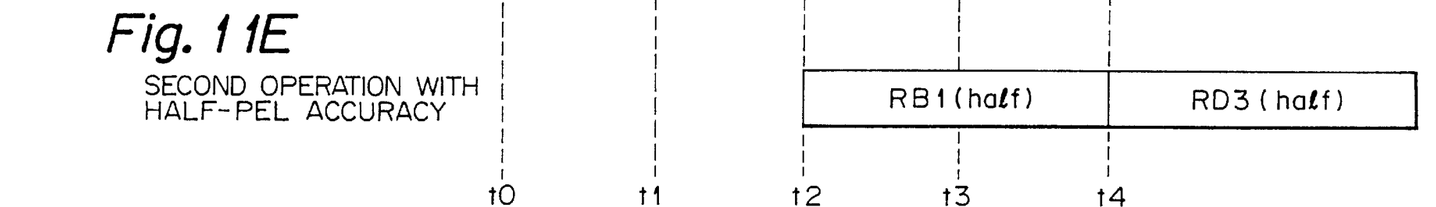

Output of a matching error for the reference block RB1 starts at time $t_2$. At the same time, data is read out from the FIFO 16 to perform interpolation, and half-pel matching operation is executed by the half-pel matching operational circuit 14, as shown in FIG. 11E. The half-pel matching operational circuit 14 is designed to progress two operations in parallel. The maximum period of this half-pel matching operation is 256 clocks after completion of the integer-pel matching operation of the reference block RB0.

These operations are repeated for subsequent reference blocks. Integer-pel motion vectors and half-pel motion vectors, thus obtained, are combined by and output from the integrating circuit 20.

The invention is not limited to embodiments where half-pel motion vectors are to be detected, but also adaptive for embodiments where quarter-pel motion vectors are to be obtained.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A motion vector detecting device, comprising:
   a reference block memory for storing image data of a reference block having N×M pixels, where N and M are integers greater than or equal to one;
   a search block memory for storing image data of a search block having said N×M pixels;
   a first matching operational circuit for detecting correlation between said N×M pixels of said image data of said reference block stored in said reference block memory and said N×M pixels of said image data of said search block stored in said search block memory with integer-pel accuracy;
   a reference block buffer memory for storing said image data of said reference block;
   a search block buffer memory for storing said image data of said search block;
   a second matching operational circuit for detecting correlation between said N×M pixels of said image data of said reference block stored in said reference block buffer memory and said N×M pixels of said image data of said search block stored in said search block buffer memory with less than or equal to half-pel accuracy, said first matching operational circuit and said second matching operational circuit being operated in parallel.

2. The motion vector detecting device according to claim 1, wherein operation timing of said first matching operational circuit is different from that of said second matching operational circuit.

3. The motion vector detecting device according to claim 2, wherein each of said image data of said reference block and said search block is video frame signal.

4. The motion vector detecting device according to claim 3, wherein said second matching operational circuit performs a matching operation in every odd and even field of said video frame signal.

5. The motion vector detecting device according to claim 4, wherein said second matching operational circuit has an operational period that is no more than twice as long as an operational period of said first matching operational circuit, where each of said operational periods represents the time required to detect the correlation between said image data of said reference block and said image data of said search block.

6. The motion vector detecting device according to claim 5, wherein said operational period of said first matching operational circuit for detecting the correlation between next N×M pixels of said image data of said reference block and next N×M pixels of said image data of said search block begins approximately at the middle of said operational period of said second matching operational circuit for detecting the correlation between current N×M pixels of said image data of said reference block and current N×M pixels of said image data of said search block.

7. A motion vector detecting method, comprising the steps of:
   storing a reference block memory with image data of a reference block having N×M pixels, where N and M are integers greater than or equal to one;
   storing a search block memory with image data of a search block having N×M pixels;

detecting correlation between said N×M pixels of said image data of said reference block stored in said reference block memory and said N×M pixels of said image data of said search block stored in said search block memory with integer-pel accuracy by a first matching operational circuit;

storing a reference block buffer memory with said image data of said reference block;

storing a search block buffer memory with said image data of said search block;

detecting correlation between said N×M pixels of said image data of said reference block stored in said reference block buffer memory and said N×M pixels of said image data of said search block stored in said search block buffer memory with less than or to equal half-pel accuracy by a second matching operational circuit, said first matching operational circuit and said second matching operational circuit being operated in parallel.

8. The motion vector detecting method according to claim 7, wherein operation timing of said first matching operational circuit is different from that of said second matching operational circuit.

9. The motion vector detecting method according to claim 8, wherein each of said image data of said reference block and said search block is video frame signal.

10. The motion vector detecting method according to claim 9, wherein said second matching operational circuit performs a matching operation in every odd and even field of said video frame signal.

11. The motion vector detecting method according to claim 10, wherein said second matching operational circuit has an operational period that is no more than twice as long as an operational period of said first matching operational circuit, where each of said operational periods represents the time required to detect the correlation between said image data of said reference block and said image data of said search block.

12. The motion vector detecting method according to claim 11, wherein said operational period of said first matching operational circuit for detecting the correlation between next N×M pixels of said image data of said reference block and next N×M pixels of said image data of said search block begins approximately at the middle of said operational period of said second matching operational circuit for detecting the correlation between current N×M pixels of said image data of said reference block and current N×M pixels of said image data of said search block.

* * * * *